United States Patent [19]
Rias

[11] Patent Number: 4,756,955
[45] Date of Patent: Jul. 12, 1988

[54] HIGH DENSITY COMPOSITE BASED ON DISCONTINUOUS MINERAL FIBERS

[75] Inventor: Jean-Claude Rias, Villennes sur Siene, France

[73] Assignee: Isover Saint-Gobain Recherche, Aubervilliers, France

[21] Appl. No.: 33,907

[22] Filed: Mar. 31, 1987

Related U.S. Application Data

[63] Continuation of Ser. No. 712,442, Mar. 18, 1985, abandoned.

[30] Foreign Application Priority Data

Jul. 5, 1983 [FR] France .................................. 83 11164

[51] Int. Cl.⁴ ............................................. D04H 1/08
[52] U.S. Cl. .................................... 428/281; 264/113; 264/125; 156/242; 428/280; 428/283; 428/288; 428/290; 428/903; 428/920; 428/156; 428/273
[58] Field of Search ............... 264/113, 125, 126, 128; 428/280, 281, 283, 288, 156, 903, 920, 290, 273; 156/242

[56] References Cited

U.S. PATENT DOCUMENTS 4,430,380 2/1984 Honel et al. ....................... 428/290
4,433,020 2/1984 Narukawa et al. ................ 428/290

Primary Examiner—James J. Bell
Attorney, Agent, or Firm—Oblon, Fisher, Spivak, McClelland & Maier

[57] ABSTRACT

The invention relates to a high density composite sheet based on discontinuous mineral fibers. The inventive sheet has a content of mineral fibers greater than 70 wt. % of the total weight of fibers and binder, and has a density between 400 and 1600 kg/m³. The sheet can be employed in particular as an architectural structural wall facing, as a component of a composite insulating panel, etc., and is formed by compressing at high pressure at least one non-woven layer of discontinuous mineral fibers provided with a polymerizable resin which is cured during compression.

10 Claims, 2 Drawing Sheets

HIGH DENSITY COMPOSITE BASED ON DISCONTINUOUS MINERAL FIBERS

This application is a continuation of application Ser. No. 06/712,442, filed on Mar. 18, 1985, now abandoned.

BACKGROUND OF THE INVENTION

1. Field of the Invention

The present invention relates to a sheet comprised of a high density composite material based on discontinuous mineral fibers, e.g., fibers comprised of glass or mineral rock materials.

The term "sheet" as used in connection with the invention encompasses pieces of fixed segment length as well as continuous sheet.

2. Background of the Invention

The discontinuous mineral fibers, particularly glass fibers, are generally employed for thermal insulation and for acoustic insulation. Accordingly, they are present in the form of low density mats or felts, bound together by a polymerized resin. These mats generally contain more than 70 wt. % of glass fibers, with the remainder comprising the polymerized binder; the apparent density of the mat is about 10 kg/m$^3$.

Non-woven materials based on mineral fibers may also be employed as starting materials for the manufacture of molded panels such as covers for skylights or sunroof openings in automobile roofs, acoustic panels, automobile cowling panels and other miscellaneous body panels, etc. For these applications they are combined with one or more facing sheets under elevated pressure and temperature, to produce the desired configuration of the panel as well as to effect the polymerization of the binder and the cohesion of the constituent elements of said panel. The core produced on the basis of non-woven mineral fiber materials has a mean apparent density after molding which is relatively high but which nonetheless remains generally less than 200 kg/m$^3$. While more rigid than a felt, this core has very good mechanical properties such as burst strength, modulus of elasticity, and tensile strength.

In a different area of technology, that of glass fiber reinforced plastic materials, continuous glass fibers are generally employed, to serve as reinforcing means. However there is known, from Fr. Pat. No. 2,248,154, a composite material reinforced with glass fibers, employing discontinuous glass fibers. In manufacturing this material, a web or mat of discontinuous fibers is formed to which a liquid or semi-liquid hardenable material is applied, comprised of a synthetic resin, and the fibrous web or mat and the hardenable material are compressed such that the web or mat is impregnated with said material, to obtain a sheet which serves as a mold blank for subsequent molding. This mold blank sheet is comprised of glass fibers in the amount of 30 to 60 wt. %, the remainder being essentially the synthetic resin. The mechanical properties of the product are generally comparable to those of other reinforced plastic materials. However, such reinforced plastic materials are relatively expensive. Furthermore, they are sensitive to temperature variations. In addition, they may deform substantially under load.

SUMMARY OF THE INVENTION

The invention proposes a novel product having satisfactory mechanical properties and, at the same time, exceptional dimensional stability in the face of changes in humidity and in load; and these properties confer on it advantages in many diverse applications.

The inventive product is in the form of a composite sheet based on discontinuous mineral fibers which are bound together by a polymer binder, with the fibers comprising greater than 70 wt. % of the total mass of fibers and binder, wherewith the density of said sheet is generally between 400 and 1500 kg/m$^3$, and wherewith the said composite sheet is formed beginning with a non-woven mass of mineral fibers obtained by classical processes of production of felts or insulation mats, which mass is strongly compressed at a temperature which assures the polymerization of the binder.

In addition to the advantages described above, the inventive composite sheet is generally lighter than conventional fiber reinforced plastics, due to its porous structure. It is moldable. While it is highly rigid, at the same time it is quite elastic. The sheet has good mechanical workability, i.e., it can be readily sawed, drilled, punched, and nailed, without cracking or deforming. In addition, it has good resistance to unintentional piercing. It may be combined or associated with a wide variety of materials, and thus has numerous potential applications.

DETAILED DESCRIPTION OF THE INVENTION

Figure 1:
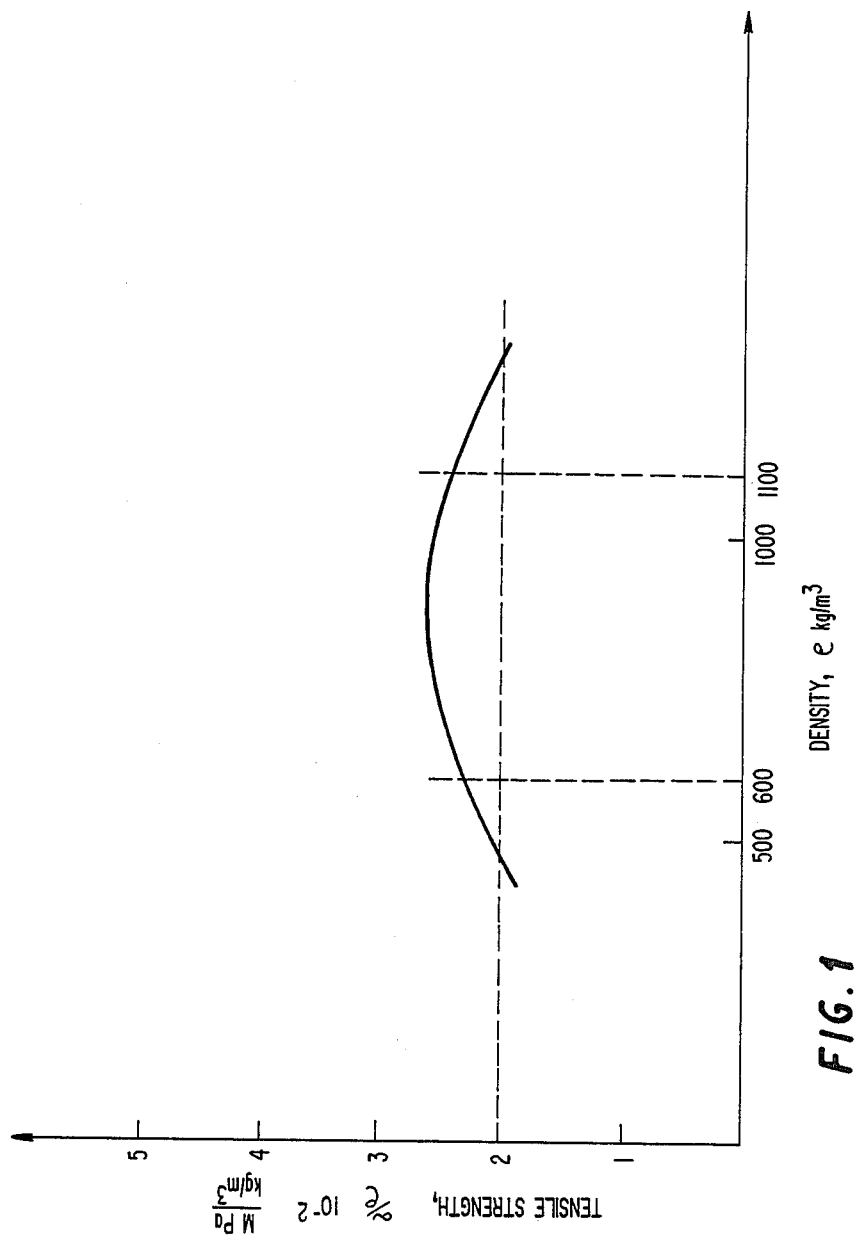

As indicated above, the sheet produced from the non-woven insulation material is comprised essentially of discontinuous mineral fibers, in the amount of more than 70 wt. % of fibers, plus binder. In the particular case of glass fibers the binder generally is comprised of binders customarily employed in insulating mats or felts, e.g. heat-setting resin such as phenol-formaldehyde resin, a melamine formaldehyde resin, or a urea-formaldehyde resin.

Another advantage of the inventive sheet is that it employs a non-woven insulation material, which is produced using a technique which is partially well known.

Among the applications envisaged for the inventive composite sheet are architectural applications such as: interior or exterior structural wall facing panels; an element of a ceiling; or an element of a partition wall. Also, applications other than architectural applications, include such as: in furniture, as an element of a laminated board or other laminated structure; in a trailer, camper or the like, as body panels or the like; as an element in packaging or decorations; or in the skin of a boat or the like.

The inventive composite sheet is about 0.1 to 30 mm thick, generally 1 to 10 mm thick for the applications envisaged, with the thickness being affected by the one or more non-woven layers used as a basis and further being affected by the pressure applied at the time of molding.

Certain additives may be added to the binder, depending on the intended application for the sheet.

Thus, in one advantageous embodiment of the invention, a silicone oil, e.g. polydimethylsiloxane, is introduced into the composition in the amount of about 1 wt. % (based on the weight of the sheet). This surprisingly improves certain mechanical properties such as the tensile strength.

The composite sheet is advantageously employed in either interior or exterior wall facings of either supporting or non-supporting panels comprising in addition an insulating core to which the facing is adhesively attached. Despite being quite thin, with thickness on the order of 0.1 to 10 mm and preferably 2 to 4 mm, the sheet employed in such a wall facing enables the panel to serve effectively as, in particular, an interior wall, e.g., it is suitable as a base for interior finishes applied in rows over lath, adhesives, or the like, so as to be adaptable to all types of covers comprised of small elements such as tiles and the like.

In this wall facing application, the invention may be advantageously substituted for panels comprised of particle board comprised of wood particles. In particular, the invention has a modulus of elasticity of c. $4 \times 10^5$ N/cm$^2$, which is higher than the 1.5 to $2.5 \times 10^5$ N/cm$^2$ typical of wood particle board, thus a supporting panel employing the inventive sheet has higher resistance to bending. Also, the inventive sheet has a higher tensile strength, amounting to c. 2000–2300 N/cm$^2$ as against 1350 N/cm$^2$ for a wood particle board panel.

The invention exhibits improved stability with respect to water that is superior to that for a panel comprised of wood particle board. In particular, the inventive composite sheet is not hygroscopic as is a wood particle board panel. Further, a 2 mm thick sheet of the inventive type may be used to replace a 12 mm thick wood particle board panel which must have that thickness due to the problem of fire resistance. This substantial weight advantage provided by the inventive composite panel facilitates its use.

Other additives may be incorporated into the composition of the inventive sheet. Thus, fillers comprised of, e.g., calcium carbonate, or other fillers generally employed in the plastic materials industry may be employed to improve certain mechanical properties, such as impact resistance, fire resistance, compression resistance, etc. Water repellent products which are themselves known may be incorporated into the material of the inventive sheet in order to improve resistance to water or water vapor. Also, non-mineral fibers may be incorporated, such as, e.g., wood fibers; plastic materials may be incorporated to modify certain characteristics of the sheet; and pigments may be incorporated to color to the mass of the material.

Suitable discontinuous mineral fibers are all the usual insulation fibers, i.e. glass or mineral rock fibers. Fiber diameters are generally between 2 and 15 micron.

According to one of the features of the invention, the sheet may have a layered structure. Thus, the sheet may be prepared from two or more non-woven layers of glass fiber and/or mineral rock fibers which are compressed simultaneously as described in more detail below.

The layered structure may comprise a reinforcing layer such as a grid or screen of fibers, which layer may be sandwiched between two non-woven layers of the same nature or of different natures.

The inventive composite sheet may be furnished, at the time of its fabrication by compression, with facing sheets such as kraft paper, plastic films, woven or non-woven fabrics, metallic foils, or wood veneers of various types.

According to another feature of the invention, the sheet may have various molded forms and/or surface impressions. This is one of the advantages of the inventive sheet, that it readily lends itself to various types of molds and molding, and to the incorporation of inserts during molding.

For most of the applications of the inventive sheet, its apparent density is advantageously in the range between 600 kg/m$^3$ and 1100 kg/m$^3$. This range represents a good compromise between the mechanical properties of the sheet and the conditions of its fabrication.

FIG. 1 is a plot of $\sigma/\rho$ vs. $\rho$, where $\sigma$ is the tensile strength, and $\rho$ is the density. This plot of the strength per unit density of the sheet seems to indicate that the best values are obtained for densities between 600 and 1100 kg/m$^3$, which thus defines the preferred range.

According to the further feature of the invention, the composite sheet based on discontinuous mineral fibers joined by a polymer binder has a value of $\sigma/\rho$ greater than $2 \times 10^{-2}$ MPa$-$m$^3$/kg.

The invention also relates to a method of manufacturing the composite sheet.

According to the invention, the method employs high pressures on the order of 1 to 100 bar, usually 10 to 50 bar, along with temperatures which differ depending on the nature of the binder. The duration of application of these pressures and temperatures varies, but is generally on the order of c. 1 min. For example, if the binder is a phenolformaldehyde resin, the temperature employed is generally 200° C. and the duration is about 1 min.

If a heat-hardenable binder is used, a characteristic of the method is rapid compression, to avoid prepolymerization of the binder before the final dimensions are reached.

The method may be discontinuous. Thus, before polymerization of the binder, one may place one or more non-woven layers of mineral fibers obtained by classical methods of manufacturing felts or insulating mats, into a press where the compression conditions described above are applied.

Alternatively, the [fabrication] operation may be continuous. E.g., one may pass a continuous non-woven layer, obtained following manufacture of the fibers, between the bands of a double band press. The temperature required for the polymerization is furnished by an adjoining apparatus or by heating of the said bands—a condition being that prepolymerization before the final dimensions are attained must be avoided.

Other advantages and characteristics of the invention will be apparent from the following description of examples of the manufacture of sheets.

EXAMPLE 1

An inventive sheet 2 mm thick was manufactured as follows, with compression and heat being applied:

A non-woven layer of glass insulating fibres was used, having a weight per unit surface of 1400 g/m:, said layer obtained by classical methods of fiber manufacture and fabrication. The binder used was a phenol-formaldehyde resin, in the amount of 20 wt. % based on the total weight of the glass plus binder. The layer including the binder was placed between the plates of a press.

A pressure of 10 bar was applied to compress the mass in the press, at a temperature of 200° C., for a period of 1 min. A sheet with density about 700 kg/m$^3$ was obtained, having the following satisfactory mechanical properties: tensile strength at burst or breakage $\sigma_r = 1.7 \times 10^7$ $N/m^2$; elongation at breakage $\epsilon_r = 0.53\%$; and Young's modulus of elasticity $E = 2.35 \times 10^9$ $N/m^2$.

This sheet had exceptionally good dimensional stability over a wide range of humidity conditions.

The sheet may be used as an interior or exterior wall facing as part of a composite insulating panel comprising, in addition, sandwiched between two such facing sheets, a cellular core having a thickness which depends on the degree of insulation desired, e.g. said core may comprise expanded polystyrene with a thickness of 120 mm and a density of c. 25 kg/m$^3$. The inventive sheets are adhesively bonded to the cellular core on each side of said core, using, e.g., a contact adhesive.

The resulting composite panel has a combination of characteristics which amount to better mechanical behavior, better fire resistance, and better stability on exposure to water than the corresponding properties of a similar panel employing as facing sheets two sheets of wood particle board.

EXAMPLE 2

An inventive sheet 4 mm thick was manufactured as follows, with compression and heat being applied:

Three non-woven layers of insulating fibers were stacked between the plates of a press, said layers having a weight per unit surface of 1200 g/m$^2$. These layers were obtained by classical techniques of fiber manufacture and fabrication. The binder used was a phenol-formaldehyde resin, in the amount of 20 wt. % of the total weight of fibers plus binder.

The mass was compressed with heating for 1 min, to obtain a sheet 4 mm thick. The apparent density of the sheet was c. 900 kg/m$^3$.

After removal from the mold, the sheet had the following mechanical characteristics:

Tensile strength at burst or breakage: $\sigma_r = 2.95 \times 10^7$ N/m$^2$.

Elongation at breakage: $\epsilon_r = 0.42\%$.

Young's modulus of elasticity $E = 7.95 \times 10^9$ N/m$^2$.

Figure 2:
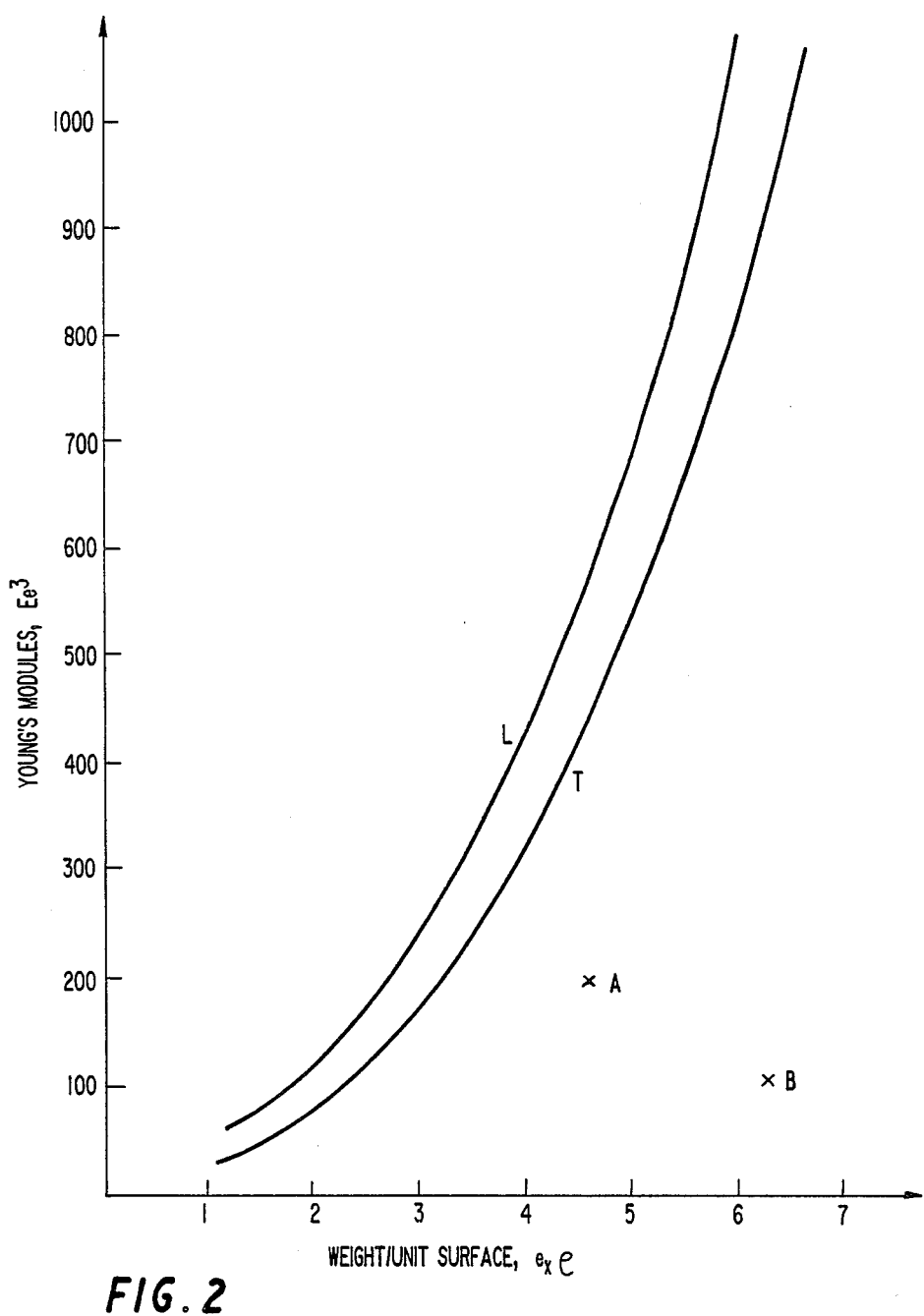

The inventive sheet was extremely rigid. FIG. 2 indicates the rigidity, in a plot of Ee$^3$, which is the product of the Young's modulus E and the cube of the thickness e (=4 mm), as a function of the weight per unit surface e $\rho$. The curve L is the longitudinal rigidity, and the curve T the transverse rigidity. The Figure shows that the rigidity increases with the weight per unit surface, and that the rigidity is greater than that of a sheet of glass-reinforced plastic 2.5 mm thick, of the type "SMC" (point A), and also greater than that of a steel sheet 0.8 mm thick (point B).

What is claimed as new and desired to be secured by Letters Patent of the United States is:

1. A composite sheet of discontinuous mineral glass or rock insulation fibers having a diameter of 2 to 15 microns bound together by a polymerized binder, said sheet produced by the process comprising forming at least one non-woven layer comprising said mineral insulation fibers including a nonpolymerized heat-hardenable binder, compressing said layer at a pressure of about 1–100 bar at a temperature which assures polymerization of the binder; wherein said compressed sheet comprises said mineral insulation fibers in an amount greater than 70 wt. % of the total weight of the fibers plus binder, and has a density between 400 and 1500 kg/m$^3$, said composite sheet being a porous sheet.

2. A composite sheet according to claim 1; characterized in that the mineral fibers are glass fibers.

3. A composite sheet according to claim 1 and characterized in that the binder is a heat-hardenable resin chosen from the group consisting of phenol-formaldehyde, melamine-formaldehyde, urea-formaldehyde resin and mixtures thereof.

4. A composite sheet according to claim 1, further comprising at least one additive selected from the group consisting of fillers, water-repellant agents, silicone oils and pigments.

5. A composite sheet according to claim 1; characterized in that its density is between 600 and 1100 kg/m$^3$.

6. A composite sheet according to claim 1 based on discontinuous mineral glass or rock insulation fibers, being bound together by a polymerized binder, said sheet produced from at least one non-woven layer of fibers, said layer compressed under heating;
   characterized in that said sheet has a content of mineral fibers greater than 70 wt. % of the weight of the fibers plus binder, and has a value of $\sigma/\rho$, the ratio of the tensile strength to the density, greater than $2 \times 10^{-2}$ MPa$-^3$/kg.

7. A composite sheet according to claim 1; characterized in that it has a molded shape.

8. A composite sheet according to claim 1; characterized in that it has surface impressions.

9. A method of manufacturing the composite sheet of claim 1, comprising compressing at least one non-woven layer of discontinuous mineral visulating fibers including a polymerizable resin under a pressure between 1 and 100 bar, at a temperature sufficient to polymerize said binder, and for a duration of at least about 1 min.

10. The process of claim 9, wherein said pressure is between 10 and 50 bar.

* * * * *